Patented Sept. 20, 1949

2,482,085

UNITED STATES PATENT OFFICE 2,482,085

METHOD FOR THE PREPARATION OF SULFATHIAZOLES

Michael N. Dvornikoff, St. Louis, Mo., assignor to Monsanto Chemical Company, St. Louis, Mo., a corporation of Delaware No Drawing. Application June 23, 1944,
Serial No. 541,849

7 Claims. (Cl. 260—239.6)

This invention relates to the preparation of sulfa drugs and in particular to the syntheses of new 4-thiazoline derivatives and a process of preparing sulfathiazole therefrom.

An object of the invention is to provide novel 4-thiazoline derivatives which are useful in themselves as therapeutic agents and as intermediates for the preparation of sulfathiazole.

Another object of the invention is to provide a process for preparing novel 4-thiazoline derivatives which are useful as therapeutic agents and as intermediates for the preparation of sulfathiazole.

A further object of the invention is to provide a novel process for preparing sulfathiazole.

Other objects will become apparent from the following description and examples.

The present invention, generally stated, comprises reacting 2-aminothiazole in aqueous solution in the presence of an alkaline agent, such as sodium bicarbonate or sodium carbonate, with an acyl benzene sulfonyl halide having the formula:

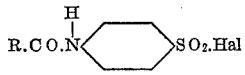

in which R.CO represents an acyl radical, such as the acetyl, butyryl and benzoyl and hexahydrobenzoyl radicals. The reactants may be added to the aqueous reaction medium in the form of dry materials or in the form of wet materials, such as aqueous slurries or pastes. The fact that water wet acyl sulfanilyl halides may be used is of particular advantage, since it eliminates the drying operation together with the cost of that operation in time and materials. Moreover, the 2-aminothiazole may be employed as the hydrohalide, for example, the hydrochloride or hydrobromide, in which instance the free 2-aminothiazole is liberated by adding an alkali, such as sodium bicarbonate or sodium carbonate to the aqueous solution before adding the N⁴-acyl sulfanilyl halide. The solid product of the reaction is separated from the reaction mixture, washed with water and dried. The product is a 2-imino-3-(N⁴-acyl-sulfanilyl)-4-thiazoline having the formula:

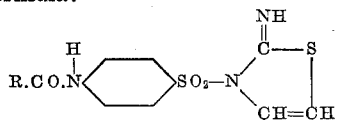

The product may also be called 2-imino-3-(N⁴-acyl-sulfanilyl)-2,3-dihydrothiazole. The products isolated from the reaction mixtures are white powders which may be useful for their activity against various micro-organisms and also as intermediates in the preparation of other therapeutic agents, such as sulfathiazole.

As a further embodiment of the present invention, the thiazoline derivatives hereinbefore described when heated are converted to the corresponding 2-(N⁴-acyl-sulfanilyl) thiazoles having the formula:

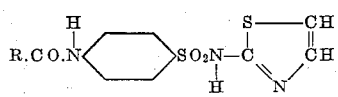

In some instances, it may be desirable to heat at a temperature below the melting point of the thiazoline derivative to effect the conversion. In other instances, the compounds may be heated to the melting point, or even higher. Instead of heating the 4-thiazoline derivative alone, the derivative may be mixed with dry pyridine and the mixture heated to effect the conversion to the corresponding 2-acyl-sulfonamido derivatives.

As a specific embodiment of the present invention, 2-aminothiazole is reacted in an aqueous solution with acetyl-sulfanilyl chloride in the presence of an alkaline agent such as sodium bicarbonate or sodium carbonate. The solid product of the reaction is separated from the reaction mixture, washed with water and dried. The product obtained is 2-imino-3-acetyl-sulfanilyl-4-thiazoline having the formula:

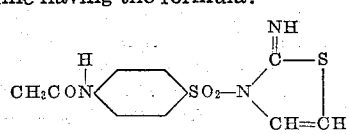

When the above product is melted and heated, for example in vacuum at approximately 160° C., a reaction takes place substantially without the loss of weight of the starting product, and the reaction product is N⁴-acetylsulfathiazole, having the formula:

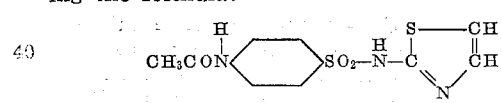

The N⁴-acetylsulfathiazole product can then be hydrolyzed to remove the acetyl residue with the resultant formation of sulfathiazole. As an alternative, the novel product, 2-imino-3-acetyl-sulfanilyl-4-thiazoline may be heated in dry pyridine to approximately 75° C. for about one hour. The product resulting from this treatment is again N⁴-acetylsulfathiazole. The addition of a quantity of acetylsulfanilyl chloride to the dry pyridine solution tends to increase the yield of N⁴-acetylsulfathiazole.

The aforedescribed process is distinguished from the process commonly employed to prepare sulfathiazole and which comprises reacting anhydrous 2-aminothiazole with anhydrous acetylsulfanilyl chloride in anhydrous pyridine. Such a process produces 2-acetylsulfathiazole which is subsequently hydrolyzed to sulfathiazole. Applicant's discovery of the novel thiazoline derivative and a method for preparing the same, together with a method for preparing sulfathiazole obviates the necessity of preparing anhydrous acyl sulfanilyl halides and permits the utilization of aminothiazole in the form of its salt.

The following examples are provided to illustrate the novel features of the invention. These examples are to be construed merely as illustrative of the invention and not as limiting the invention to the particular reaction conditions described therein.

*Example I*

One-tenth mole of 2-aminothiazole is dissolved in 150 cc. of water. The solution may be treated with charcoal and is then filtered. To the filtrate is added in small portions 0.115 mole of acetylsulfanilyl chloride and 0.140 mole of sodium bicarbonate. While the addition is being made, the solution is agitated and maintained at a temperature of about 5–10° C. One-fourth of the acetylsulfanilyl chloride is introduced in 30 minutes, and then the bicarbonate and the remaining acetylsulfanilyl chloride are added within a period of 1 to 2 hours. The mixture is stirred at about 5–10° C. for two hours, and the stirring is continued at room temperature for about 10 hours longer until all acetylsulfanilyl chloride is reacted. The solid product of the reaction is separated by filtration, washed with water, and the filter cake is sucked as dry as possible and dried at room temperature. The yield of 2-imino-3-acetylsulfanilyl-4-thiazoline is 28 g. (94% of the theoretical amount based on 2-aminothiazole; 81% based on acetylsulfanilyl chloride). The product is a white powder which upon heating forms $N^4$-acetylsulfathiazole.

*Example II*

The process of Example I is repeated, using 41.2 g. of acetylsulfanilyl chloride containing 35% of water and 16.0 g. (0.1 mole) of 2-aminothiazole hydrochloride containing 15% of water, together with 0.1 g. equivalent of sodium carbonate. The yield of the resulting 2-imino-3-acetylsulfanilyl-4-thiazoline was substantially that obtained in Example I. Upon heating the compound, the product was converted to $N^4$-acetylsulfathiazole, which was then hydrolyzed with dilute alkali to form sulfathiazole.

*Example III*

Fifteen grams of 2-imino-3-acetylsulfanilyl-4-thiazoline, prepared according to the process of Example I, were melted and heated in vacuum at 160° C. No loss in weight was observed. The reaction product was subjected to alkaline hydrolysis which yielded crude sulfathiazole, M. P. 184° C. (10.0 g.; 78% yield). The purified sulfathiazole melted at 198° C. (7.0 g.; 54% yield, based on the thiazoline).

*Example IV*

A mixture of 29.7 grams (0.1 mole) of the thiazoline derivative, prepared according to Example I, and 45 cc. of dry pyridine was maintained at 75° C. for 1 hour. $N^4$-acetylsulfathiazole was obtained in 75% yield. This product upon hydrolysis gave a 95% yield of crude sulfathiazole, M. P. 193° C.

*Example V*

A mixture of 29.7 g. (0.1 mole) of the thiazoline derivative, prepared according to Example I, 45 cc. of dry pyridine and 6 g. of acetylsulfanilyl chloride was maintained at 75° C. for 1 hour. $N^4$-acetylsulfathiazole was obtained in 88% yield. This product was subsequently hydrolyzed to provide crude sulfathiazole.

*Example VI*

The process of Example I was repeated, using 35.1 g. of $N^4$-butyryl sulfanilyl bromide and 10.0 g. of 2-aminothiazole. The resulting product was 2-imino-3-($N^4$-butyryl sulfanilyl)-4-thiazoline. This product may be used as a pharmaceutical or may be heated in pyridine or alone according to the methods of Examples III and IV to form the corresponding $N^4$-butyryl sulfathiazole which in turn may be hydrolyzed to form sulfathiazole.

*Example VII*

The process of Example I was repeated, using 0.115 mole of $N^4$-benzoyl sulfanilyl iodide and 0.1 mole of 2-aminothiazole. The resulting product was 2-imino-3-($N^4$-benzoyl sulfanilyl)-4-thiazoline. This product may be used as a pharmaceutical or may be heated in pyridine or alone, according to the methods of Examples VI and V to form the corresponding $N^4$-benzoyl sulfathiazole. This product may be hydrolyzed to form sulfathiazole.

I claim:

1. A process of preparing an $N^4$-acylsulfathiazole which comprises heating an anhydrous 3-($N^4$-acylsulfanilyl)-2-imino-4-thiazoline having the formula:

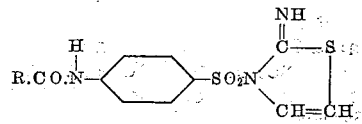

in which R.CO represents an acyl radical, until conversion to the corresponding $N^4$-acylsulfathiazole is complete.

2. A process of preparing $N^4$-acylsulfathiazole which comprises heating an anhydrous 3-($N^4$-acylsulfanilyl)-2-imino-4-thiazoline having the formula:

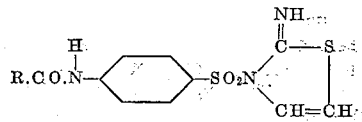

in which R.CO represents an acyl radical, at about 160° C. until conversion to the corresponding $N^4$-acylsulfathiazole is complete.

3. A process of preparing an $N^4$-acylsulfathiazole which comprises heating an anhydrous 3-($N^4$-acylsulfanilyl)-2-imino-4-thiazoline having the formula:

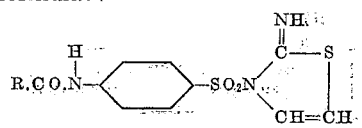

in which R.CO represents an acyl radical, in anhydrous pyridine at about 75° C. until conversion to the corresponding $N^4$-acylsulfathiazole is complete.

4. A process of preparing $N^4$-acetylsulfathiazole which comprises heating an anhydrous 3-($N^4$-acetylsulfanilyl)-2-imino-4-thiazoline until conversion to $N^4$-acetylsulfathiazole is complete.

5. A process of preparing $N^4$-acetylsulfathiazole which comprises heating an anhydrous 3-($N^4$-acetylsulfanilyl)-2-imino-4-thiazoline at about 160° C. until conversion to $N^4$-acetylsulfathiazole is complete.

6. A process of preparing $N^4$-acetylsulfathiazole which comprises heating an anhydrous 3-($N^4$-acetylsulfanilyl)-2-imino-4-thiazoline in anhydrous pyridine at about 75° C. until conversion to $N^4$-acetylsulfathiazole is complete.

7. A process of preparing $N^4$-benzoylsulfathiazole which comprises heating an anhydrous 3-($N^4$-benzoylsulfanilyl)-2-imino-4-thiazoline at about 160° C. until the conversion to $N^4$-benzoylsulfathiazole is complete.

MICHAEL N. DVORNIKOFF.

REFERENCES CITED

The following references are of record in the file of this patent:

UNITED STATES PATENTS

| Number | Name | Date |
|---|---|---|
| 2,097,414 | Kharasch | Oct. 26, 1937 |
| 2,362,087 | Newberry | Nov. 7, 1944 |

FOREIGN PATENTS

| Number | Country | Date |
|---|---|---|
| 113,723 | Australia | Sept. 4, 1941 |
| 210,425 | Switzerland | Oct. 1, 1940 |
| 517,272 | Great Britain | Jan. 25, 1940 |
| 533,495 | Great Britain | Feb. 14, 1941 |
| 848,175 | France | July 17, 1939 |

OTHER REFERENCES

Serial No. 334,990, Foldi (A. P. C.) pub. Apr. 20, 1943.

Chemical Reviews, Aug. 1940, pages 108–109, 152 and 187–189.

Helv. Chim. Acta, May 2, 1941, pp. 536–538.

Journal Amer. Chem. Soc., Oct. 1941, pp. 2739–2740.

Journal Amer. Chem. Soc., Nov. 1942, pp. 2532–2537.

Journal Amer. Chem. Soc., Feb. 1943, pp. 156–159.

Certificate of Correction

September 20, 1949

Patent No. 2,482,085

MICHAEL N. DVORNIKOFF

It is hereby certified that error appears in the printed specification of the above numbered patent requiring correction as follows:

Column 4, line 23, for "Examples VI and V" read *Examples IV and V*; and that the said Letters Patent should be read with this correction therein that the same may conform to the record of the case in the Patent Office.

Signed and sealed this 7th day of February, A. D. 1950.

[SEAL]

THOMAS F. MURPHY,
*Assistant Commissioner of Patents.*